US006824285B2

(12) United States Patent
Saitoh et al.

(10) Patent No.: US 6,824,285 B2
(45) Date of Patent: Nov. 30, 2004

(54) LIGHT SOURCE AND LIQUID CRYSTAL DISPLAY DEVICE USING THIS LIGHT SOURCE

(75) Inventors: Goroh Saitoh, Tokyo (JP); Yoshie Yagi, Tokyo (JP); Koji Mimura, Tokyo (JP); Ken Sumiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 31 days.

(21) Appl. No.: 10/277,930

(22) Filed: Oct. 23, 2002

(65) Prior Publication Data

US 2003/0099118 A1 May 29, 2003

(30) Foreign Application Priority Data

Nov. 29, 2001 (JP) ........................................ 2001-365327

(51) Int. Cl.$^7$ ............................ F21V 13/04; G02B 6/10
(52) U.S. Cl. ...................... 362/31; 362/327; 362/330; 362/331; 385/88; 385/146; 385/147
(58) Field of Search ..................... 362/31, 326, 327, 362/330, 331, 551, 559–561; 359/837; 349/65; 385/36, 88, 89, 131, 133, 146, 147

(56) References Cited

U.S. PATENT DOCUMENTS 4,767,172 A * 8/1988 Nichols et al. ............. 385/146
5,764,322 A * 6/1998 Mamiya et al. ............... 349/65
5,835,661 A * 11/1998 Tai et al. ..................... 385/146
6,139,163 A * 10/2000 Satoh et al. .................. 362/31
6,422,712 B1 * 7/2002 Nousiainen et al. .......... 362/31
6,474,826 B1 * 11/2002 Tanaka et al. ................ 362/31
6,527,411 B1 * 3/2003 Sayers ........................ 362/555

FOREIGN PATENT DOCUMENTS

| JP | 10-260405 | 9/1998 |
| JP | 11-231320 | 8/1999 |
| JP | 2000-315413 | 11/2000 |
| JP | 2001-23423 | 1/2001 |

* cited by examiner

*Primary Examiner*—Alan Cariaso
(74) *Attorney, Agent, or Firm*—Young & Thompson

(57) ABSTRACT

A small light source unit of simple structure that emits light forward with high efficiency is well-suited as a backlight in a liquid crystal display device. The light director in this unit has reflective internal faces adjacent opposite peripheral regions of the entrance face and two refractive index interfaces in it. The reflective internal faces and the refractive index interfaces are oriented on inclined planes. The refractive index of a middle region between the two interfaces is the smallest among those of the three regions making up the light director.

22 Claims, 15 Drawing Sheets

PRIOR ART

PRIOR ART

PRIOR ART

PRIOR ART

UNIT: mm

LIGHT SOURCE AND LIQUID CRYSTAL DISPLAY DEVICE USING THIS LIGHT SOURCE

BACKGROUND OF THE INVENTION

1. Field of the Invention

The present invention relates to a light source used in a display device, a sensor, a scanner, a printer and the like, and particularly relates to a light source used as an illuminating means of a liquid crystal display device and to a liquid crystal display device using these light sources.

2. Description of Related Art

As an illuminating means of a liquid crystal display device, several methods using a tube-shaped lamp such as a cold cathode ray tube or an LED (light emitting diode) as a primary light source (light source emitting light by itself) are in use. In case of combining a liquid crystal panel of a transmission type with a tube-shaped lamp, as shown in FIG. 2, a structure in which a tube-shaped lamp 21 covered with a reflector 22 is arranged at one side of a planar light guide 24 and a reflecting plate 23 is arranged at the back of the planar light guide 24, and a diffusing plate 25 is arranged at the entrance face side is made to be the mainstream from the viewpoint of space saving. And in case of combining a liquid crystal panel of a reflection type with a tube-shaped lamp, a structure in which a tube-shaped lamp covered with a reflector is arranged at one side of a planar light guide and the planar light guide is arranged at the observer side of the liquid crystal panel of a reflection type is formed.

The use of an LED as a primary light source is superior to a tube-shaped lamp from the viewpoint of power saving and space saving. However, it is difficult to obtain a uniform light emission as a planar light guide since the light emitting face of an LED is small.

Several methods for solving this problem are known. For example, as shown in FIG. 3 disclosed in Japanese Patent Laid-Open Publication No. 10-260,405 (reference 1), a uniform light emission is obtained by arranging a linear light guide 32 for spreading light from an LED 31 in the shape of a line between the LED 31 and a planar light guide 24 (FIG. 3). And as disclosed in Japanese Patent Laid-Open Publication No. 11-231,320 (reference 2), there is also a method of disposing a linear light guide and forming an array of projections on the entrance face of a planar light guide. Further, as a method of using no linear light guide, there is mentioned a method of providing a blind hole 41 depressed in the direction of thickness having a function of refracting and reflecting light emitted from a light source in a light guide member, as disclosed in FIG. 4 in Japanese Patent Laid-Open Publication No.2001-23,423 (reference 3).

By using these methods, it is possible to obtain uniform light emission, so that the planar light guide can be combined with a liquid crystal panel as an illuminating means in a similar manner to the case of a tube-shaped lamp.

In the above-mentioned techniques, the angular distribution of emergent light is so wide that a large amount of the light is not used efficiently. For example, a white LED of chip type used in a liquid crystal display device for a mobile information terminal emits light with distribution of about ±60°, which is much wider than the field of view of an observer. In case that light 51 having such a distribution is incident on a linear light guide or a planar light guide as disclosed in reference 1 or 2 (FIG. 5(a)), the light outputted from the planar light guide has a similar angular distribution (emergent light angular distribution) to the incident light (using such a projection structure as shown in reference 2 makes the emergent light angular distribution more spread). Further, since light from a liquid crystal display panel to an observer 56 has also a similar angular distribution, the amount of light incident on an eye of the observer becomes small (FIG. 5(b)).

In short, the efficiency of utilizing light is lowered. This becomes a problem in particular in a liquid crystal display device for a mobile information terminal in which space and power saving are demanded. In FIG. 5(a), symbol 32 is a linear light guide, symbol 52 is emergent light from the linear light guide, symbol 53 is a liquid crystal panel of a reflection type, symbol 54 is emergent light from a planar light guide, symbol 55 is reflected light for displaying on the liquid crystal panel of a reflection type, symbol 56 is an observer, and symbol 57 is light to come into an eye of the observer.

As a method for solving this problem, there is a method mentioned in Japanese Patent Laid-Open Publication No.2000-315,413 (reference 4). In reference 4 (FIG. 6), a collimating structure covered with a light reflecting plate 61 is shown. The structure has a part that is wide at the light guide side and narrow at the light source side. However, it is required to form a number of said complicated collimating structures between the light source and the light guide. In FIG. 6, symbol 62 is incident light from the light source and symbol 63 is emergent light from the collimating means.

As a method for narrowing the emergent light angular distribution, there is a method of affixing a lens to an LED. However, a light source is required to be far smaller than the lens (the light source is at least $\frac{1}{10}$ relative to the lens) (FIG. 7(a)). For example, in case that a light source 31 and a lens 71 are close in size as shown in FIG. 7(b), light goes through with various angles, so that a large part of light 72 cannot be used efficiently. Therefore, the method of affixing a lens to an LED requires a lens to be very large in comparison with the size of an LED and is difficult to be used as an illuminating means of a liquid crystal display device from the viewpoint of space saving.

As a method of using a lens shape, it is difficult also to apply a structure of combining a lens face 84 with a total reflection surface 83 (FIG. 8(a)) disclosed in "a paper by Singo Tamai et al., pp.1,247 in a collection of papers read at the Electronics Society Convention 2000, the Institute of Electronics, Information and Communication Engineers of Japan" (reference 5) to an illuminating means of a liquid crystal display device (FIG. 8(b)), since the combined structure needs a much larger lens shape in comparison with the size of an LED in the same way as described above.

Although it is conceivable also to use an LED disclosed in reference 5 as a primary light source, it is difficult from the viewpoint of space saving to be used as a primary light source, because the LED disclosed in reference 5 is much larger than an LED chip due to the size of a lens and a structure of a reflecting plate 82. Further, such a complicated structure may cause an increase in cost.

SUMMARY OF THE INVENTION

The purpose of this invention is to provide a light source that is simple and space-saving, and has a narrow light distribution angle.

A light source unit of the present invention is characterized by a light director taking in light from a primary light source through an entrance face and outputting it, having reflection faces on both sides of the entrance face. The light director preferably has two refractive index interfaces on the way from the entrance face to the exit face, wherein the refractive index of the entrance face side is larger than that of the exit face side in the first refractive index interface and the refractive index of the exit face side is larger than that of the entrance face side in the second refractive index interface.

It is possible to arrange the angular distribution of incident light with high efficiency by reflecting the light being large in angle of incidence from the primary light source by using the reflecting surfaces, and making the reflected light enter again the first refractive index interface as making smaller its angle of incidence onto the first refractive index interface by means of the reflecting surfaces at both sides of the entrance face, and make narrow the angular distribution of emergent light with high efficiency by further making narrower the emergent light angular distribution by means of the second refractive index interface.

On the assumption that a straight line passing through the middle point of the entrance face and the middle point of the exit face is the principal axis, the refractive index of the entrance face side of the first refractive index interface is n1, the refractive index of the exit face side of the first refractive index interface is n2, a desired emergent light angular distribution value having the principal axis as its center is β (β is an absolute value), and an angle made by the principal axis and the first refractive index interface is θ1, it is possible to obtain a desired emergent light angular distribution (β) with high efficiency by forming the first refractive index interface out of two inclined planes meeting the expression (1).

$$90°-\sin^{-1}(n2/n1) \leq \theta1 \leq 90°-\{\sin^{-1}(n2/n1)-\beta\} \quad (1)$$

It is possible to make the light reflected by the first refractive index interface enter again the first refractive index interface with high efficiency as making narrow the angle of incidence onto the first refractive index interface by a fact that an angle φ made by the reflection faces at both sides of the entrance face and the principal axis meets the following expression (2).

$$\theta1-45° \leq \phi \leq \theta1 \quad (2)$$

Further, on the assumption that an angle made by the second refractive index interface and the principal axis is θ2, in case of forming the second refractive index interface out of two inclined planes meeting the following expression (3), it is possible to make an emergent light angular distribution narrow with high efficiency.

$$\theta1/2 \leq \theta2 \quad (3)$$

As a primary light source for these light sources it is preferable to use an LED (light emitting diode) from the viewpoint of space saving and power saving and the like.

And one aspect of the present invention is a linear light source provided with a linear light guide in the direction of emergent light of said light director exit face. It is possible to obtain emergent light with high efficiency by providing reflection faces on the opposite faces to a linear exit face in this linear light guide. And the opposite faces to the exit face may be inclined to the exit face. Further, it is possible to suppress leakage light and obtain emergent light with high efficiency by touching closely or adhering the exit face of the light director and the entrance face of the linear light guide to each other. And it is possible also to form the light director and the linear light guide into one body by assuming the straight line tying to each other the—intersecting points of the second refractive index interface and the side faces. Further, it is possible to suppress leakage light and obtain emergent light with high efficiency by covering the other faces than the exit face and said light director or linear light source with a reflective member.

Another aspect of the present invention is to provide a planar light guide in the direction of emergent light of said linear light source exit face. It is possible to obtain emergent light with high efficiency by providing projections on the faces opposite to the exit face of a planar light guide. Further, it is possible to obtain uniform emergent light by making the refractive index of the projections on the opposite faces to the exit face larger than the propagating part. It is possible to suppress leakage light and obtain emergent light with high efficiency by touching closely or adhering the exit face of the linear light source and the entrance face of the planar light guide to each other. The linear light source and the planar light guide may be formed into one body.

It is possible to achieve a bright liquid crystal display device by mounting said planar light guide on a liquid crystal display panel. By making a planar light guide serve also as a substrate forming a liquid crystal display panel and providing a transparent layer being smaller in refractive index than the planar light guide at the liquid crystal layer side of the planar light guide, it is possible to suppress a depth feeling to occur at the time of mounting the liquid crystal display panel with the planar light guide, further secure the amount of guided light propagating through the planar light guide and obtain a uniform display.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

The present invention will now be described in detail below with reference to the accompanying drawings.

<First Embodiment>

Figure 9A:
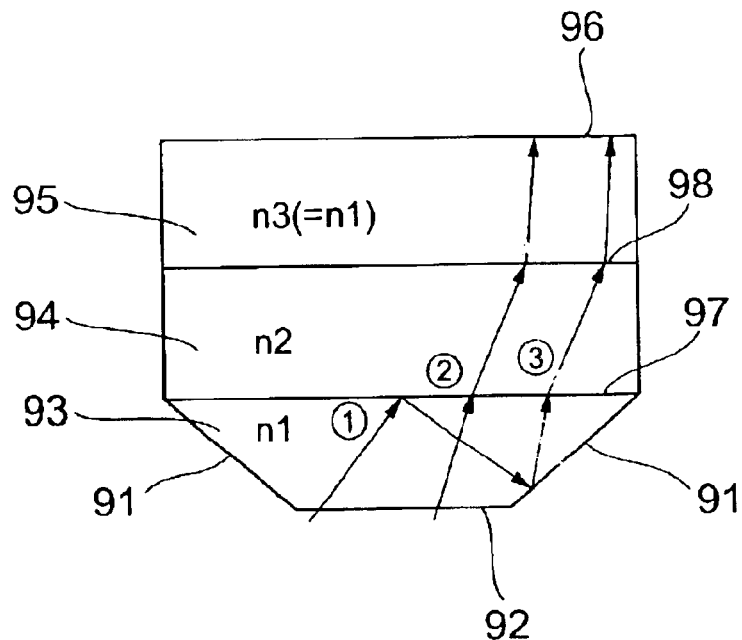
FIG. 9(a) is schematic top view showing embodiment 1 of the present invention.

FIG. 9(a) is a top view showing a first embodiment of the present invention. As shown in FIG. 9(a), a light director of this embodiment includes a light director portion 1 (refractive index: n1) denoted by symbol 93 comprising an entrance face 92 and reflection faces 91 at both sides of the entrance face 92, a light director portion 2 (refractive index: n2) denoted by symbol 94 being smaller in refractive index than the light director portion 1, and a light director portion 3 (refractive index: n3) denoted by symbol 95 being larger in refractive index than the light director portion 2 and having an exit face. The light being incident on a first refractive index interface 97 at an angle larger than a critical angle ($\sin^{-1}$ (n2/n1)) in the first refractive index interface (the refractive index interface between the light director portion 1 and the light director portion 2) 97 out of light coming in through the entrance face of the light director portion 1 is reflected by the first refractive index interface 97 ((1) in FIG. 9(a)), while the light being smaller than the critical angle passes through it ((2) in FIG. 9(a)). By this, it is possible to remove once the light being large in angle of incidence out of incident light. Further the light reflected by the first refractive index interface 97 is made small in angle of incidence on the first refractive index interface 97 by the reflection face 91 at each side of the entrance face, and is again incident on the first refractive index interface 97 and passes through the first refractive index interface 97 ((3) in FIG. 9(a)). Therefore, it is possible to change the light being large in angle of incidence out of incident light into the light being small in angle of incidence with high efficiency. Next, the light which has passed through the first refractive index interface 97 and entered the light director portion 2 ((1) and (2) in FIG. 9(a)) is refracted in such a direction that it is made larger in exit angle due to the difference in refractive index between the light director portions 1 and 2, and is refracted in such a direction that it is made smaller in exit angle due to the difference in refractive index between the light director portions 2 and 3. According to this, it is possible to narrow the exit angle of emergent light.

Figure 9B:
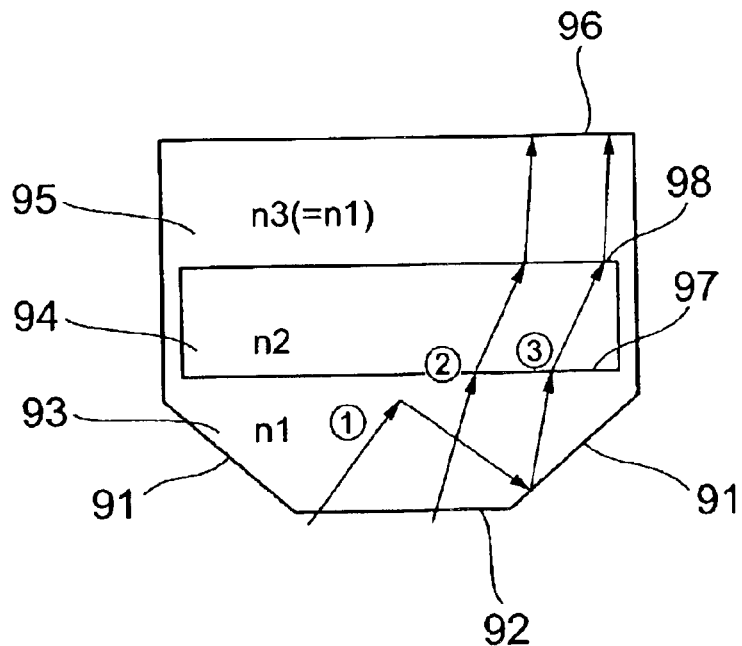
FIG. 9(b) is schematic top view showing embodiment 1 of the present invention.

This light director functions well, provided only that the light director portion 1 is larger in refractive index than the light director portion 2 and the light director portion 3 is larger in refractive index than the light director portion 2, and may be also of such a structure as shown in FIG. 9(b) in addition to FIG. 9(a). Symbol 96 is the exit face of the light director and symbol 98 is the second refractive index interface.

<Second Embodiment>

Figure 10:
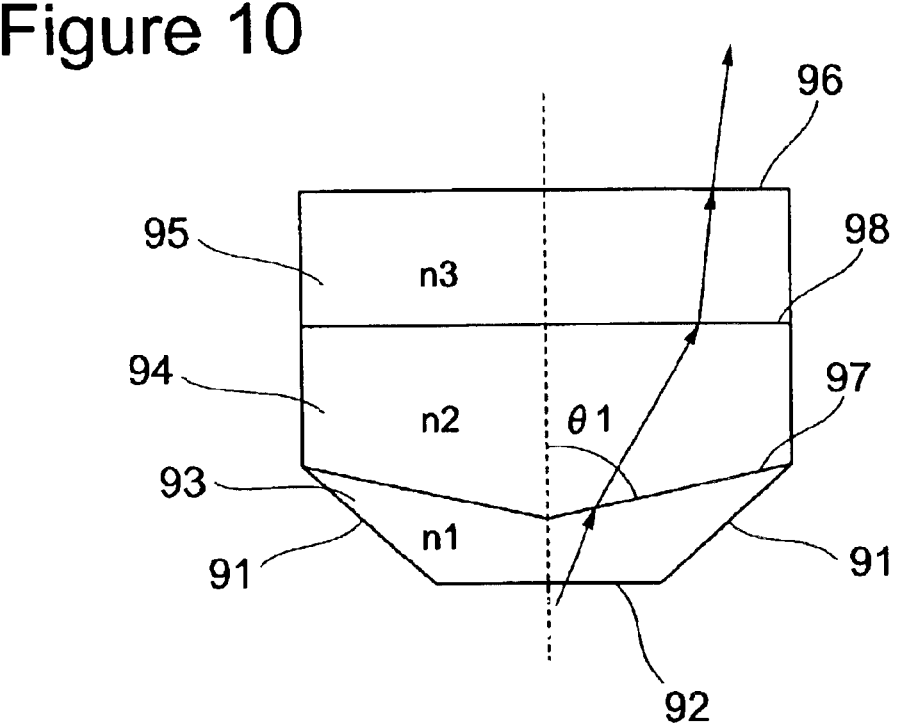
FIG. 10 is a schematic top view showing embodiment 2 of the present invention.

FIG. 10 is a top view showing a second embodiment of the present invention. In this embodiment, on the assumption that a straight line passing the middle point of the entrance face and the middle point of the exit face is the principal axis, and further the refractive index of the entrance face side of the first refractive index interface 97 is n1, the refractive index of the exit face side of the first refractive index interface 97 is n2, a desired emergent light angular distribution value having the principal axis as its center is β (β is an absolute value), and an angle made by the principal axis and the first refractive index interface is θ1, the first refractive index interface 97 is formed out of two inclined planes meeting the following expression (1) (FIG. 10).

$$90°-\sin^{-1}(n2/n1) \leq \theta1 \leq 90° - \{\sin^{-1}(n2/n1) - \beta\} \qquad (1)$$

Figure 11:
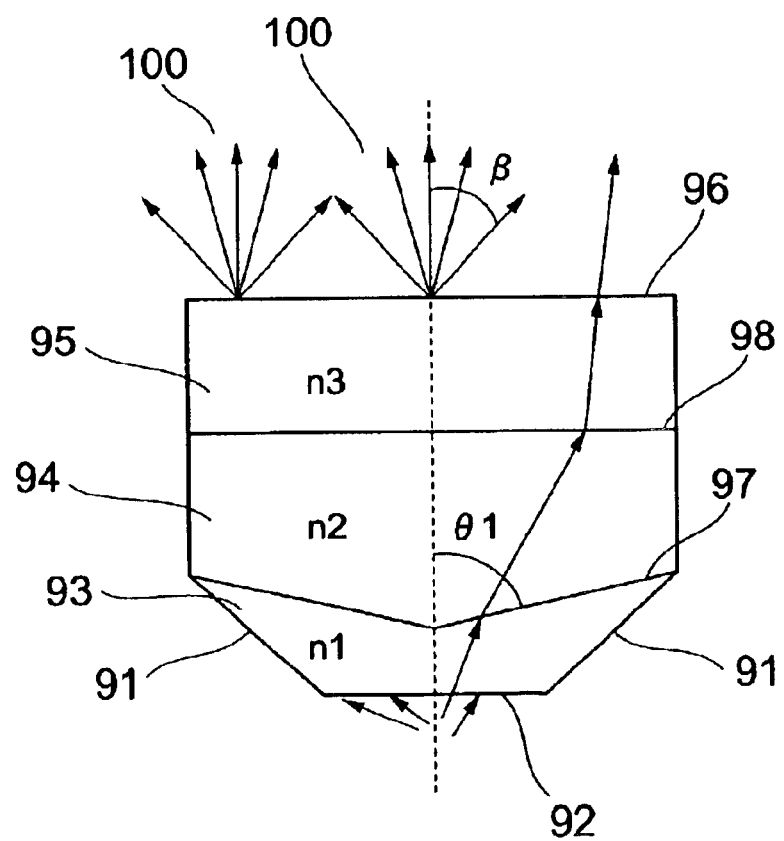
FIG. 11 is a schematic view showing an emergent light angular distribution value β in the present invention.
Figure 12A:
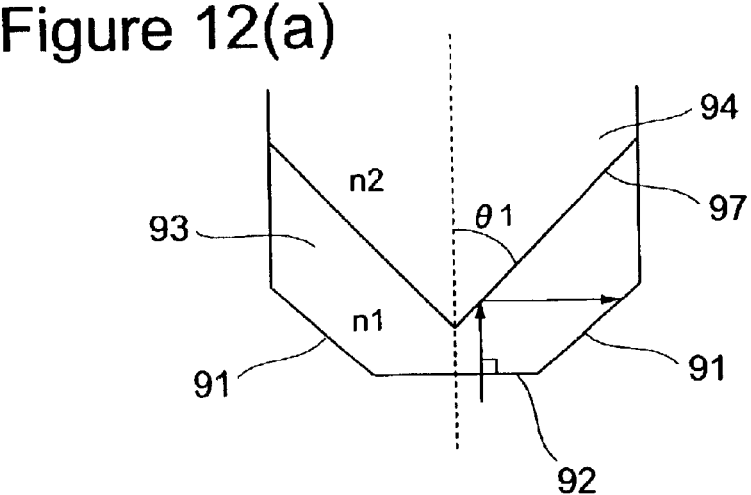
FIG. 12(a) is schematic top view showing embodiment 2 of the present invention.
Figure 12B:
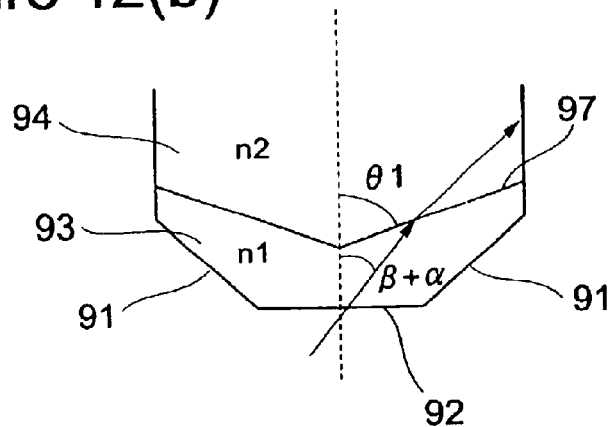
FIG. 12(b) is schematic top view showing embodiment 2 of the present invention.

A desired emergent light angular distribution value β is the maximum angle in a emergent light angular distribution, namely, it shows β=30° in case of narrowing incident light within an emergent light angle of ±30° (FIG. 11). When θ1 becomes smaller than "90°−$\sin^{-1}$ (n2/n1)", since even the light being perpendicularly incident onto the entrance face is reflected, the efficiency results in being lowered (FIG. 12(a)). In short, since a great part of incident light passes through by way of a reflection face, the efficiency results in being lowered. And in case that θ1 is larger than "90−$\sin^{-1}$ (n2/n1)", since even the light being larger in exit angle than a desired angular distribution passes through the first refractive index interface 97, the rate of light being larger than β in emergent light results in being large (FIG. 12(b)). Therefore, it is preferable that θ1 is within the range of the expression (1).

<Third Embodiment>

Figure 13:
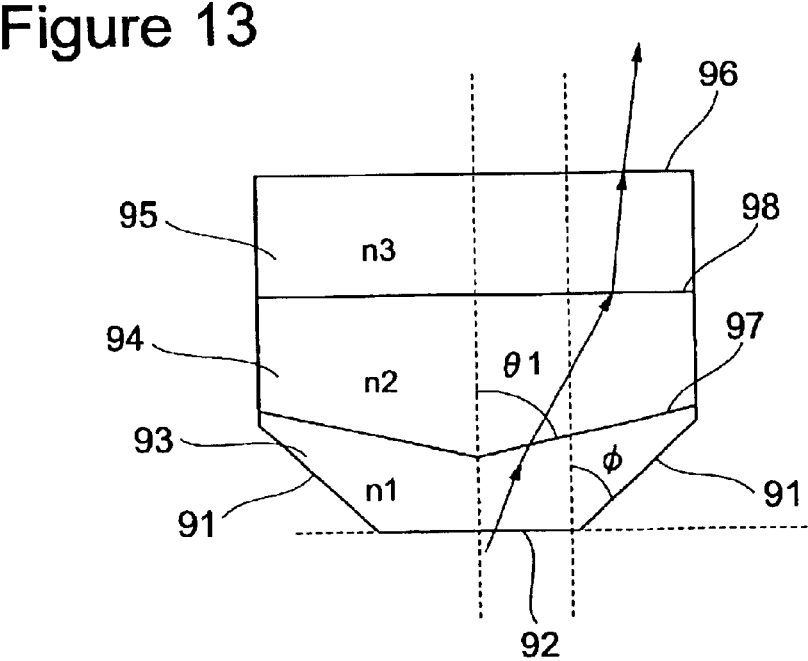
FIG. 13 is a schematic top view showing embodiment 3 of the present invention.

FIG. 13 is a top view showing a third embodiment of the present invention. In this embodiment, an angle φ made by a reflection face 91 at each side of an entrance face and the principal axis meets the following expression (2).

$$\theta1-45° \leq \phi \leq \theta1 \quad (2)$$

Figure 14A:
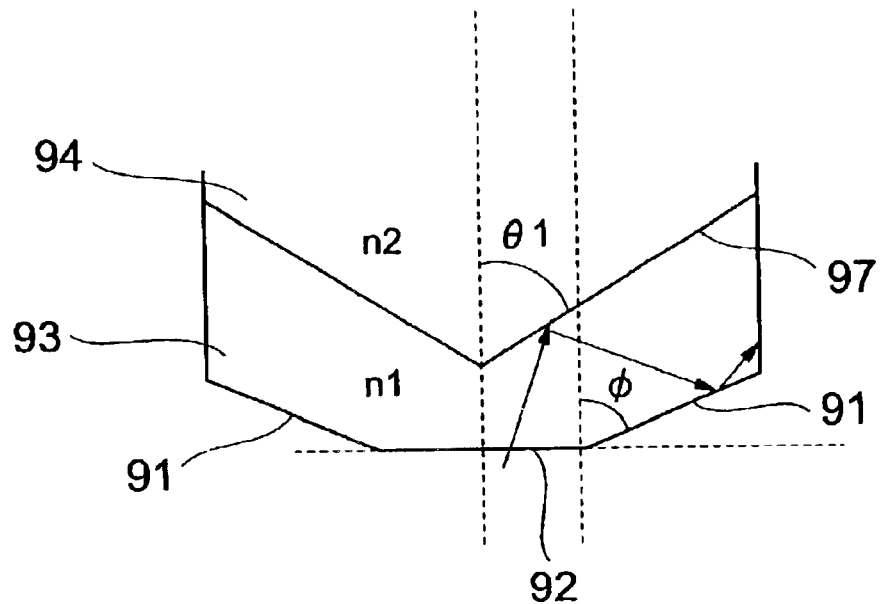
FIG. 14(a) is schematic top view showing embodiment 3 of the present invention.
Figure 14B:
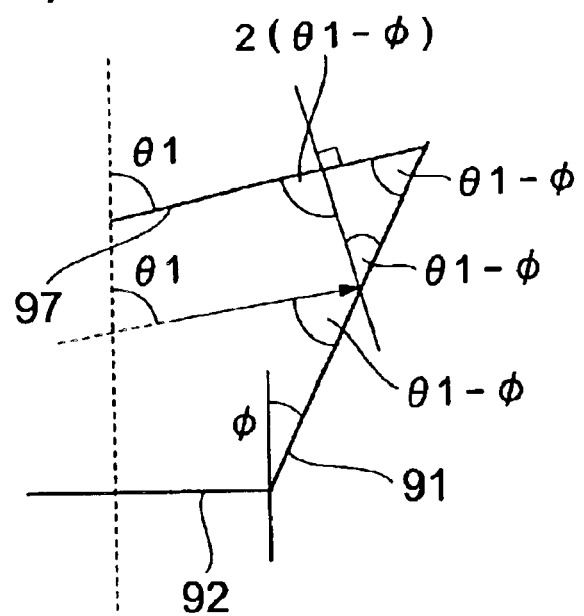
FIG. 14(b) is schematic top view showing embodiment 3 of the present invention.

In order that the reflection faces at both sides of the entrance face reflect the light reflected by a first refractive index interface 97 and make small its angle of incidence onto the first refractive index interface, it is preferable that φ is equal to or greater than θ1 (FIG. 14(a): in case of "φ<θ1", the angle of incidence of light which is reflected by the reflection face and is incident on the first refractive index interface becomes larger than the angle of incidence at the time of entering the first refractive index interface from the entrance face). The light passing through the first refractive index interface is desired to be incident on the first refractive index interface at an acute angle (when the light is incident on that face at an obtuse angle, it is refracted in such a direction that the emergent light angular distribution is expanded in refraction at the second refractive index interface). Since the light being the largest in angle among light which is reflected by the reflection face 91 and passes through the first refractive index interface 97 (the light being most liable to be made obtuse in angle by reflection) is light being in parallel with the first refractive index interface, it is desirable to determine φ so that this light is incident on the first refractive index interface at an angle of 90° or less. Such a condition of φ is "2(θ1−φ)≦90°", namely, "φ≦θ1−45", as shown in FIG. 14(b). Therefore, it is desirable that an angle φ made by the reflection face 91 at each side of the entrance face and the principal axis meets the expression (2).

<Fourth Embodiment>

Figure 15:
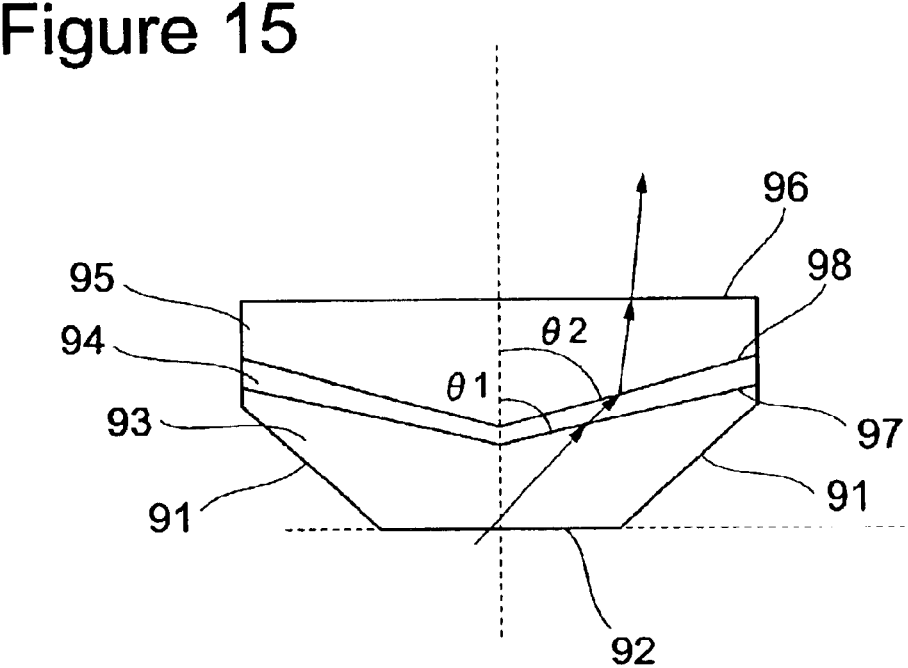
FIG. 15 is a schematic top view showing embodiment 4 of the present invention.

FIG. 15 is a top view showing a fourth embodiment of the present invention. In this embodiment, on the assumption that an angle made by the second refractive index interface 98 and the principal axis is θ2, the second refractive index interface 98 is formed out of two inclined faces meeting the following expression (3).

$$\theta1/2 \leq \theta2 \quad (3)$$

Figure 16:
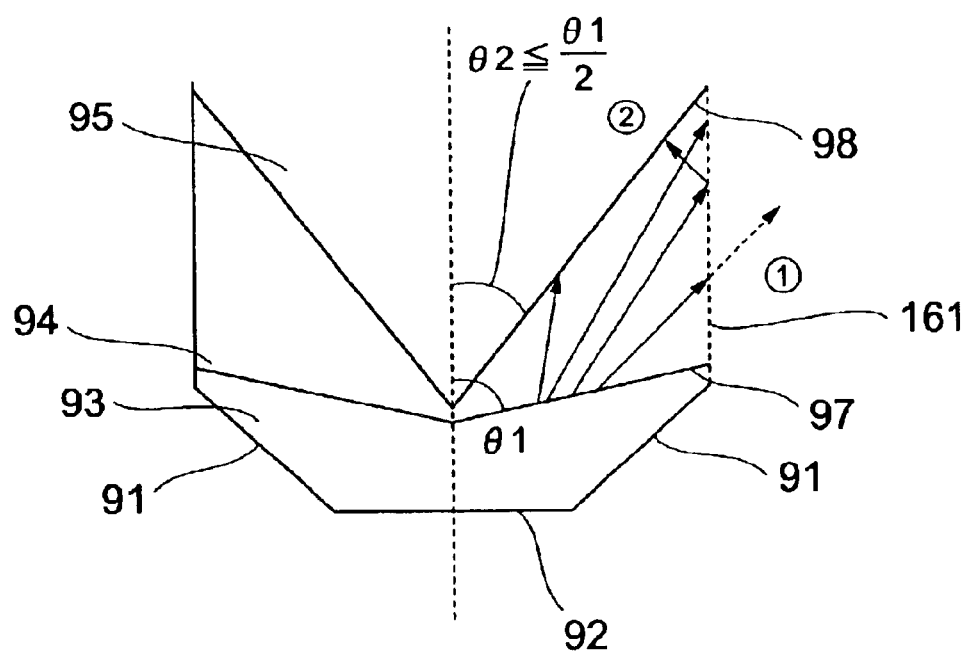
FIG. 16 is a schematic top view showing expression (3) in embodiment 4 of the present invention.

When θ2 is made smaller than half of θ1, as shown in FIG. 16, the light outputted without passing through the light director portion 3 ((1) in FIG. 16: with no side face) and the light which is reflected once by the side face and passes through the light director portion 3 ((2) in FIG. 16: in case that the side face is a reflection face 161) are made more in amount than the light directly passing through the light director portion 3. The light outputted without passing through the light director portion 3 cannot be made narrow in angle of emergent light, and the light which is reflected by the side face and passes through the light director portion 3 is lowered in intensity due to the reflection. Therefore, it is preferable that θ2 meets the expression (3).

<Fifth Embodiment>

Figure 17:
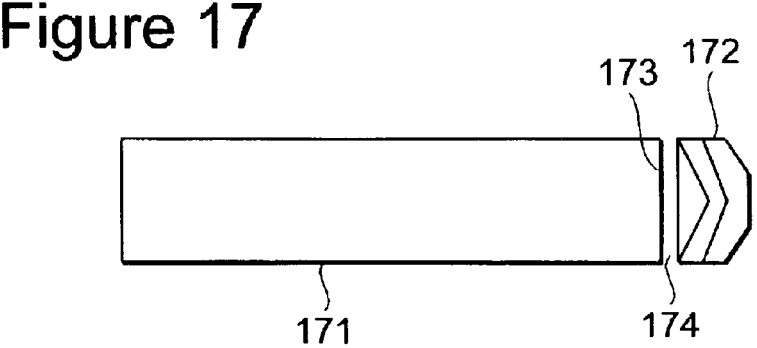
FIG. 17 is a schematic top view showing embodiment 5 of the present invention.
Figure 18:
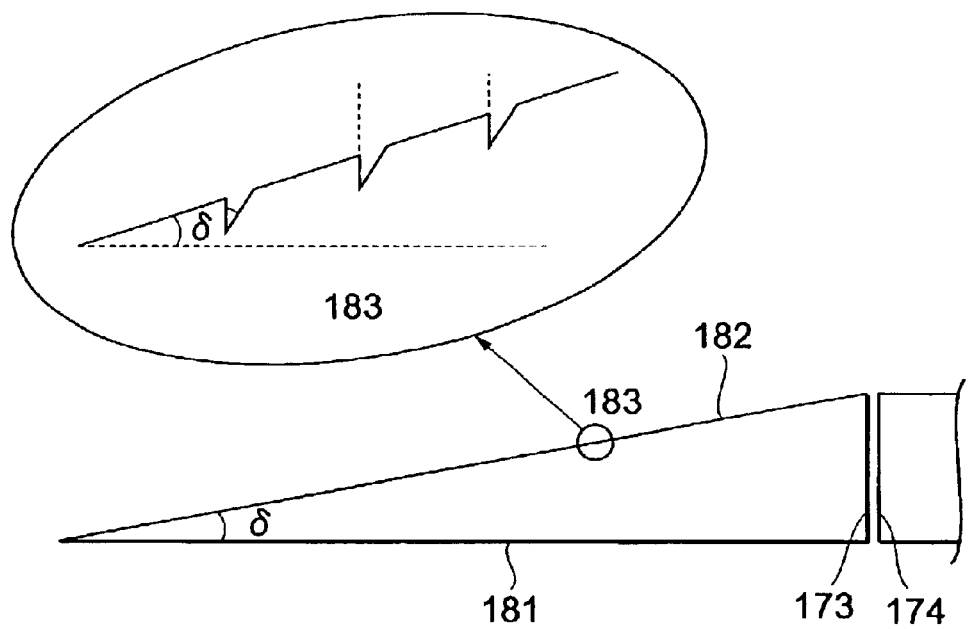
FIG. 18 is a schematic top view showing a reflecting face structure of a face opposite to the exit face of a linear light source.
Figure 19:
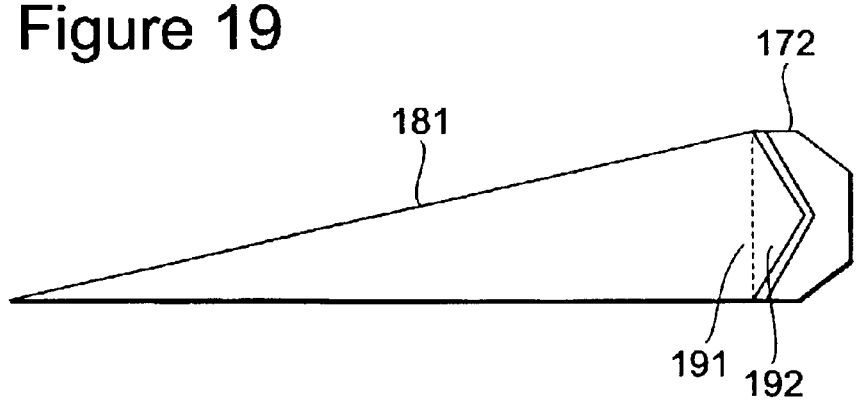
FIG. 19 is a schematic top view showing the entrance face of a light director supposed in case of forming a light director and a linear light source into one body.

FIGS. 17 and 18 are top views showing a fifth embodiment of the present invention. This embodiment is a linear light source provided with a linear light guide 171 in the direction of emergent light of a light director exit face. In this linear light guide, it is possible to obtain emergent light with high efficiency by providing a reflection face 183 on a face opposite to a linear exit face. This reflection face 183 may be a face mirror-polished by a grinding process, a face having aluminum, silver or the like deposited or sputtered on it, or a face having projections and grooves formed repeatedly on it (FIG. 18). The face 183 opposite to the exit face may be inclined to the exit face 181 (FIG. 18). Further, it is possible to suppress leakage light and obtain emergent light with high efficiency by touching closely or adhering the exit face 174 of the light director and the entrance face 173 of the linear light guide to each other. As shown in FIG. 19, the light director (light director portion 3) and the linear light guide 171 can be also made into one body by assuming that a straight line 191 tying to each other the intersecting points of the second refractive index interface and the side faces is a light director exit face. Furthermore, it is possible to suppress leakage light and obtain emergent light with high efficiency by covering the other faces than the exit face and said light director or the linear light source with a reflective material.

<Sixth Embodiment>

Figure 20A:
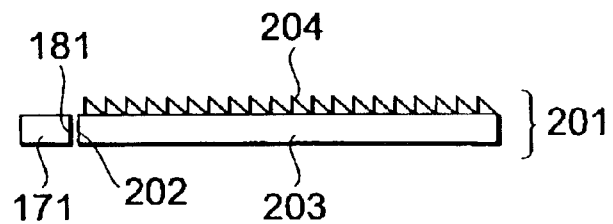
FIG. 20(a) is schematic sectional view showing embodiment 6 of the present invention.
Figure 20B:
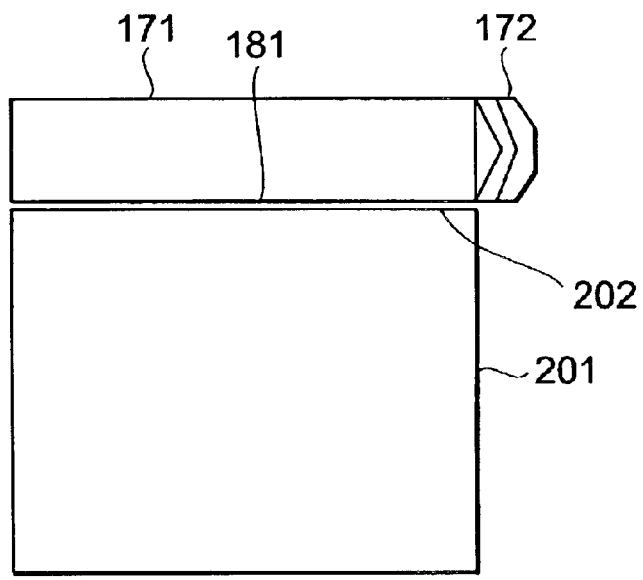
FIG. 20(b) is schematic top view showing embodiment 6 of the present invention.
Figure 21:
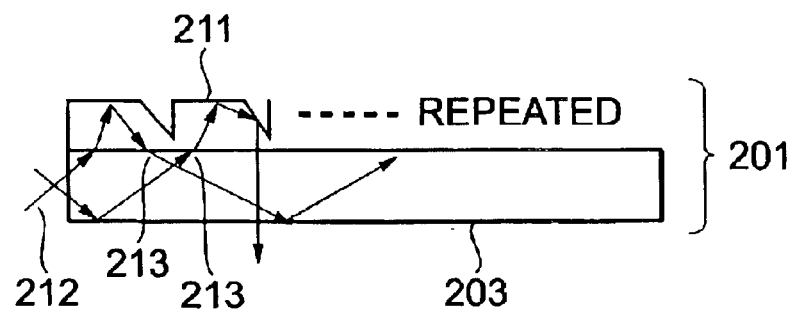
FIG. 21 is a schematic sectional view in case of making the refractive index of a projection part larger than a propagating part.

FIGS. 20(a), 20(b) and 21 show a sixth embodiment of the present invention. This embodiment is a planar light guide provided with a planar light guide 201 in the direction of emergent light of the exit face 181 of a linear light source 171. As shown in FIGS. 20(a) and 20(b), it is possible to obtain emergent light with high efficiency by providing projections 204 on a face opposite to the exit face of the planar light guide 201. By making the refractive index of the projections on the face opposite to the exit face larger than the propagating part 203, refraction is generated at the interface between the projections and the propagating part 203 and the distance from the interface to the surface of the projections is shortened and light can be propagated all over the planar surface, and thereby uniform emergent light can be obtained (FIG. 21). The projections having a larger refractive index than the propagating part can be made by a technique of applying a material having a larger refractive index than the planar light guide (for example, a high-refractive index ultraviolet-setting resin) to the propagating part, pressing a metal mold corresponding to the shape of the projections against the material, hardening the material and then detaching the metal mold, or a technique of making a sheet having projections by means of a similar technique and adhering the sheet with the projections to the propagating part, or the like. Further, it is possible to suppress leakage light and obtain emergent light with high efficiency by touching closely or adhering the exit face of the linear light source and the entrance face of the planar light guide to each other. The linear light source and the planar light guide may be formed into one body.

<Seventh Embodiment>

Figure 2:
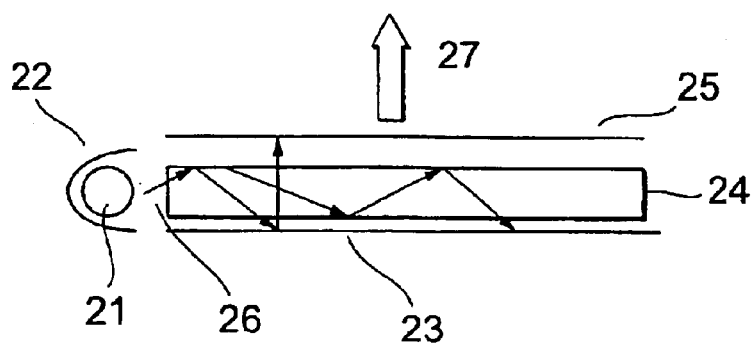
FIG. 2 is a schematic sectional view showing a conventional example having a tube-shaped lamp and a liquid crystal panel of a transmission type combined with each other.
Figure 3:
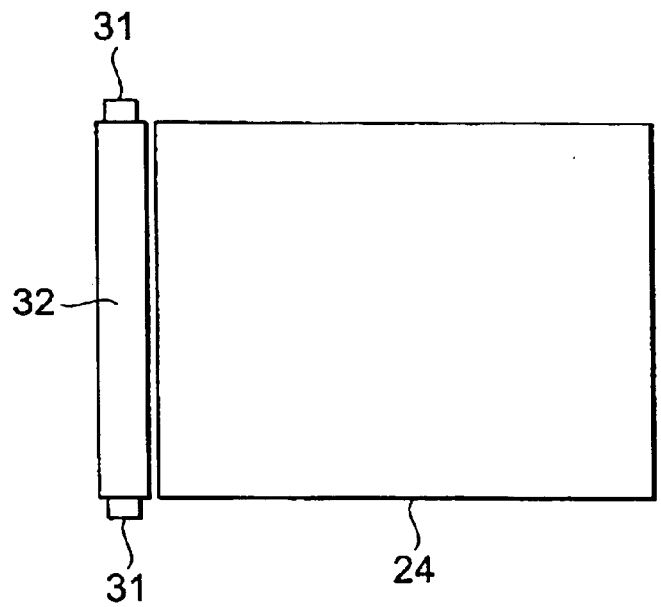
FIG. 3 is a schematic top view showing a conventional example having a linear light guide arranged between an LED and a planar light guide.
Figure 4:
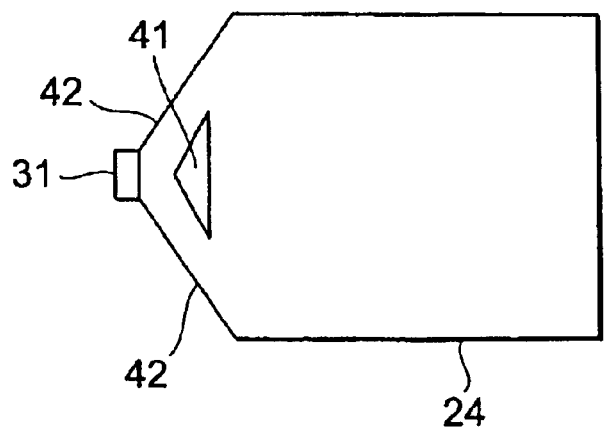
FIG. 4 is a schematic top view showing a conventional example provided with a blind hole.
Figure 5A:
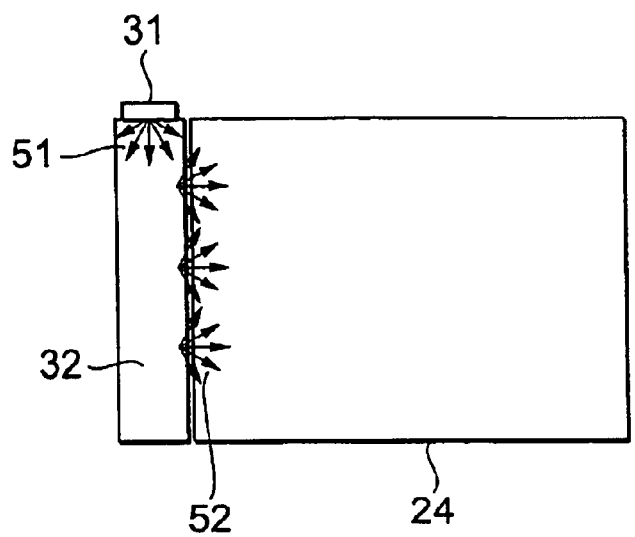
FIG. 5(a) is schematic top view showing the emergent light angular distribution of a conventional example.
Figure 5B:
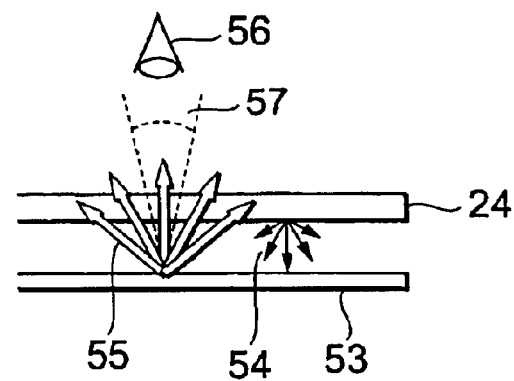
FIG. 5(b) is schematic sectional view showing the emergent light angular distribution of a conventional example.
Figure 6:
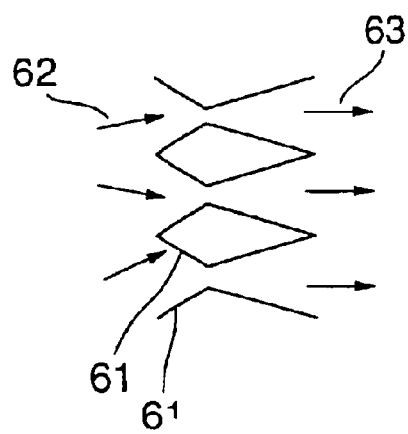
FIG. 6 is a schematic top view showing a collimator structure of a conventional example.
Figure 7A:
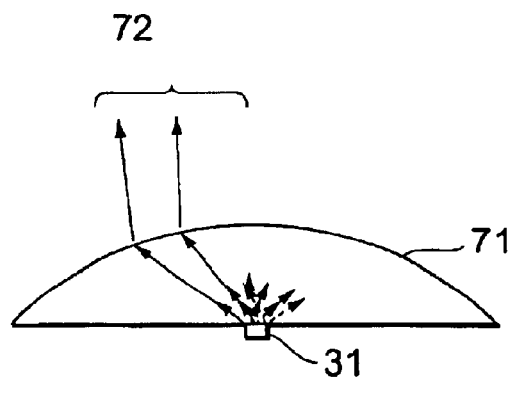
FIG. 7(a) is schematic view showing an effect in case of adhering a lens to an LED.
Figure 7B:
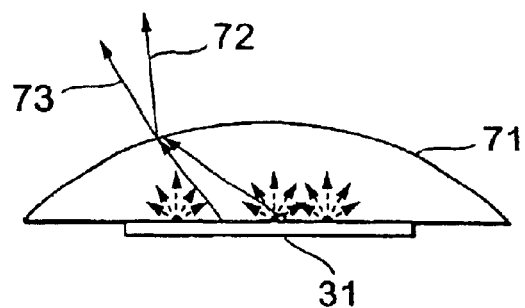
FIG. 7(b) is schematic view showing an effect in case of adhering a lens to an LED.
Figure 8A:
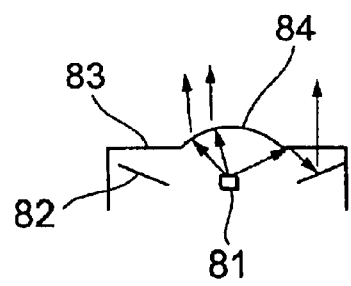
FIG. 8(a) is schematic view showing a conventional example having a lens and an LED shape combined with each other.
Figure 8B:
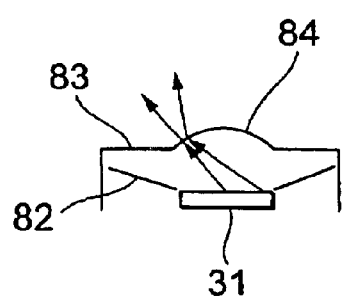
FIG. 8(b) is schematic view showing a conventional example having a lens and an LED shape combined with each other.
Figure 22A:
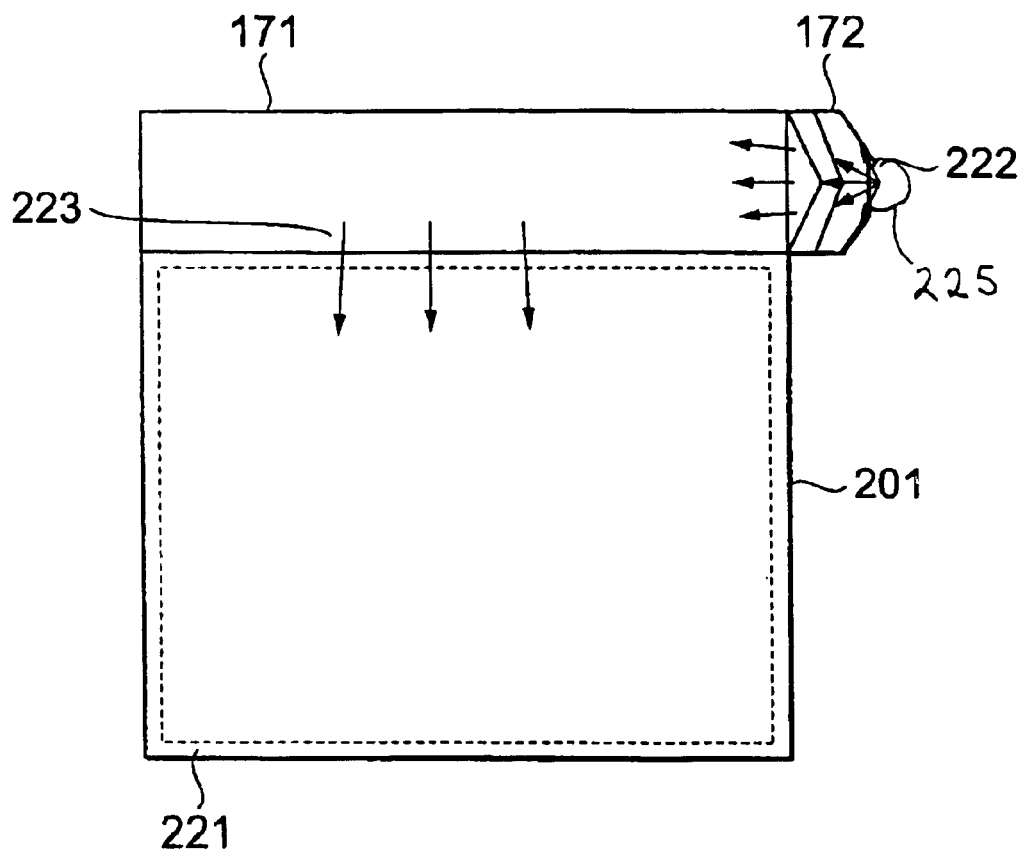
FIG. 22(a) is a schematic top view showing embodiment 7 of the present invention.
Figure 22B:
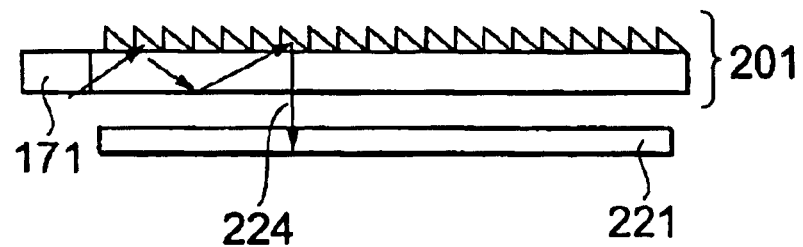
FIG. 22(b) is a schematic sectional view showing embodiment 7 of the present invention.
Figure 23:
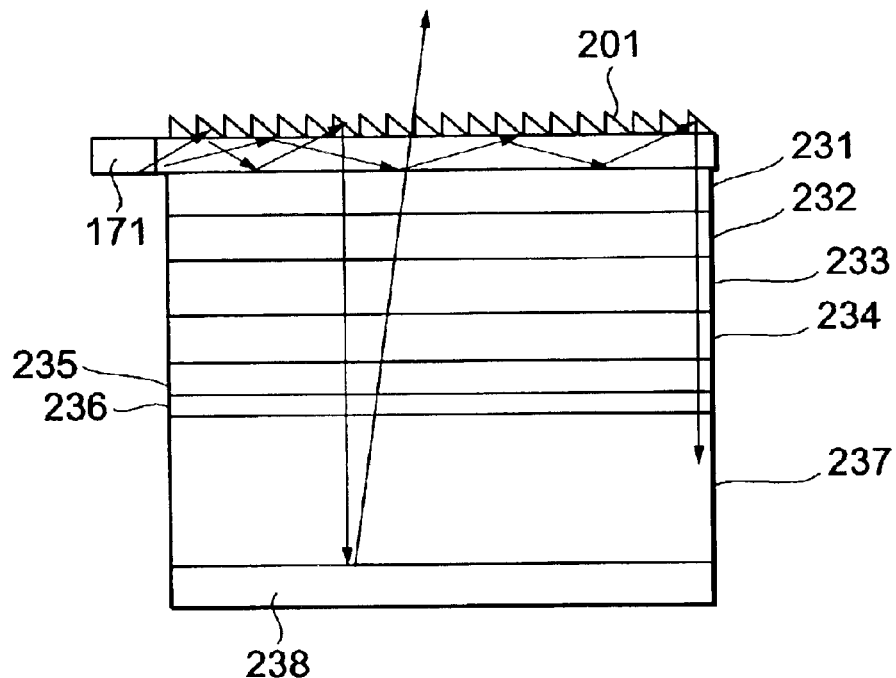
FIG. 23 is a schematic sectional view showing the propagation of light in embodiment 7 of the present invention.

FIG. 22(b) is a sectional view showing a seventh embodiment of the present invention. This embodiment is a liquid crystal display device having a liquid crystal display panel provided with a planar light guide. FIGS. 22(a) and 22(b) show a liquid crystal display panel 221 of a reflection type mounted with it but it can be applied also to a liquid crystal display panel of a transmission type in a similar structure to FIG. 2. In FIG. 22(a), symbol 172 is a light director of the present invention, symbol 222 is incident light, from a primary light source 225 (which may be in contact with light director 172), symbol 171 is a linear light guide, symbol 223 is incident light from the linear light guide 171 onto a planar light guide 201, and symbol 224 is emergent light from the planar light guide 201 to a liquid crystal display panel of a reflection type. By making the planar light guide 201 serve also as a substrate forming a liquid crystal display panel and providing a transparent layer being smaller in refractive index than the planar light guide at the liquid crystal layer side of the planar light guide, it is possible to suppress a depth feeling to occur at the time of mounting the planar light guide on the liquid crystal display panel, further secure the amount of guided light propagating through the planar light guide and obtain a uniform display (FIG. 23) In FIG. 23, symbol 231 is a low refractive index layer, symbol 232 is a color filter, symbol 233 is a polarizing layer, symbol 234 is a phase contrast layer, symbol 235 is a transparent electrode, symbol 236 is an orientating film, symbol 237 is a liquid crystal layer, and symbol 238 is an opposite substrate (including a reflection electrode, orientating film and the like).

A light director, a linear light guide and a linear light source of the present invention can be made by using such materials as acrylic resin, epoxy resin, polycarbonate resin and the like, and cutting or injection-molding these materials. A glass substrate or a resin substrate as described above can be used for a planar light guide. A planar light guide having projections and grooves can be made by cutting or injection-molding in the same way as the linear light guide and the linear light source. Further, a planar light guide having projections and grooves can be made also by a technique using a metal mold and a sheet as shown in the fifth embodiment.

Materials and Fabrication Techniques

Preferred embodiments of the present invention are described in still greater detail by the following description of materials and fabrication techniques, but the present invention is not limited to the following.

A light director (light director portions 1 and 3) and a linear light guide of the following embodiments were made by cutting acrylic resins. And a mirror-polishing process is applied to the respective faces (each of them is 1.0 mm in thickness). Reflection faces at both sides of the entrance face of the light director portion 1 are made by sputtering aluminum. Further, the other faces than the exit face are covered with a reflecting plate made of aluminum.

Figure 24:
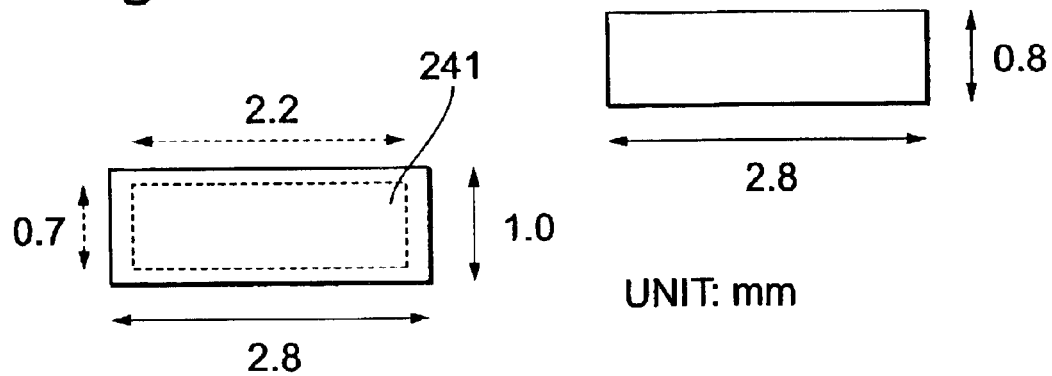
FIG. 24 is schematic views showing an LED used in the embodiments of the present invention.

A chip-type white LED 241 (width 2.8 mm×depth 1.0 mm×height 0.8 mm, and light emitting face: 2.2 mm×0.7 mm) shown in FIG. 24 is used as a light source. A result of measuring the emergent light angular distribution of this LED shows that emergent light within ±30° is 50% (the amount of light being distributed within ±30° relative to the central axis of the light emitting face among light emitted from the LED is 30%), and emergent light within ±40° is 65%. The LED light emitting face of this LED is adhered to the entrance face of the light director with a ultraviolet-setting resin.

EXAMPLE 1

Figure 25:
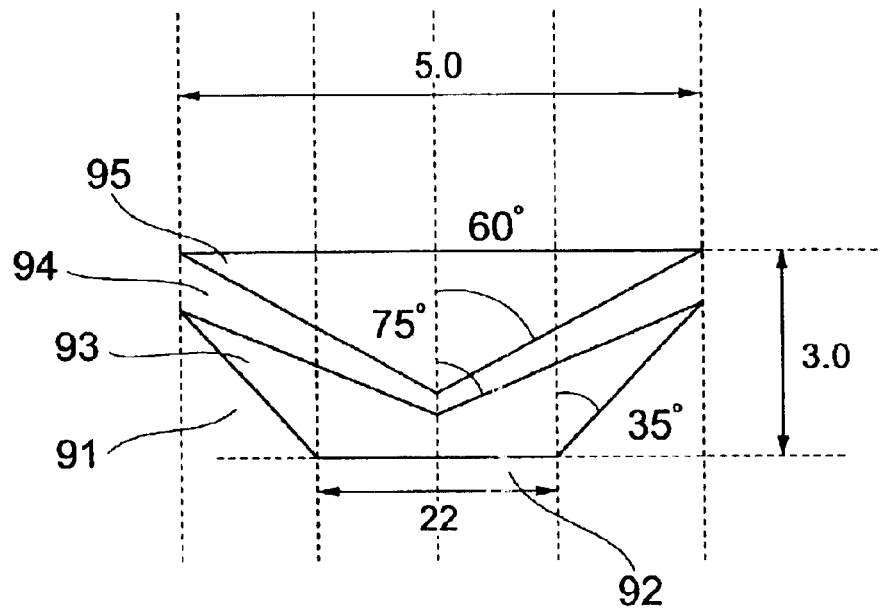
FIG. 25 is a schematic top view showing embodiment 1 of the present invention.

A desired emergent light angular distribution is determined as "$\beta=\pm30°$", and a light director portion 1 (symbol 93 in FIG. 25) and a light director portion 3 (symbol 95 in FIG. 25) (refractive index n1=n3=1.5) are made (a light director portion 2 (symbol 94 in FIG. 25) is an air layer: refractive index n2=1.0). These are assembled with a reflecting plate made of aluminum and then the other faces than the exit face are covered with reflecting plates made of aluminum. When an LED is turned on and the emergent light angular distribution of this light source is measured in a similar way to the LED, the amount of light being distributed within $\beta=\pm30°$ is 68%. Since it is possible to improve the amount of light having a desired emergent light angular distribution as much as 18% by a size as small as width 5.0 mm×length 3.0 mm, its usefulness is clear from this embodiment.

EXAMPLE 2

Figure 1:
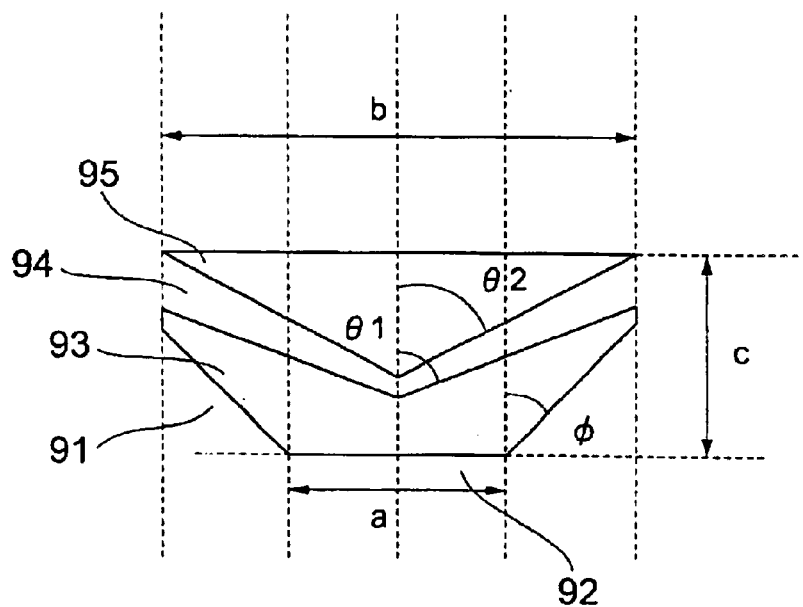
FIG. 1 is a schematic top view showing embodiments 2 to 4 of the present invention.

A desired emergent light angular distribution is determined as "$\beta=\pm30°$", and light director portions 1 and 3 (refractive index n1=n3=1.5) being in the shape shown in FIG. 1 are made (a light director portion 2 is an air layer: refractive index n2=1.0). It is determined that a=2.2 mm, b=5.0 mm, c=3.55 mm, θ1=60°, θ2=55° and φ=35°. These are assembled with a reflecting plate made of aluminum and then the other faces than the exit face are covered with reflecting plates made of aluminum. When an LED is turned on and the emergent light angular distribution of this light director is measured in a similar way to the LED, the amount of light being distributed within "$\beta=\pm30°$" is 66%. Since it is possible to improve the amount of light having a desired emergent light angular distribution as much as 16% by a size as small as width 5.0 mm×length 3.55 mm, its usefulness is clear from this embodiment.

EXAMPLE 3

A desired emergent light angular distribution is determined as "$\beta=\pm30°$", and light director portions 1 and 3 (refractive index n1=n3=1.5) being in the shape shown in FIG. 1 are made (a light director portion 2 is an air layer: refractive index n2=1.0). It is determined that a=2.2 mm, b=5.0 mm, c=2.9 mm, θ1=75°, θ2=65° and φ=55°. These are assembled with a reflecting plate made of aluminum and then the other faces than the exit face are covered with reflecting plates made of aluminum. When an LED is turned on and the emergent light angular distribution of this light director is measured in a similar way to the LED, the amount of light being distributed within $\beta=\pm30°$ is 75%. Since it is possible to improve the amount of light having a desired emergent light angular distribution as much as 25% by a size as small as width 5.0 mm×length 2.9 mm, its usefulness is clear from this embodiment.

EXAMPLE 4

A desired emergent light angular distribution is determined as "$\beta=\pm40°$", and light director portions 1 and 3 (refractive index n1=n3=1.5) being in the shape shown in FIG. 1 are made. The light director portions 1 and 3 are adhered to each other with an ultraviolet-setting resin having a refractive index n2=1.4, and it is determined that a=2.2 mm, b=5.0 mm, c=4.2 mm, θ1=55°, θ2=45° and φ=50°. The other faces than the exit face are covered with reflecting plates made of aluminum. When an LED is turned on and the emergent light angular distribution of this light director is measured in a similar way to the LED, the amount of light being distributed within $\beta=\pm40°$ is 16%. Since it is possible to improve the amount of light having a desired emergent light angular distribution as much as 25% by a size as small as width 5.0 mm×length 4.2 mm, its usefulness is clear from this embodiment.

EXAMPLE 5

Figure 26:
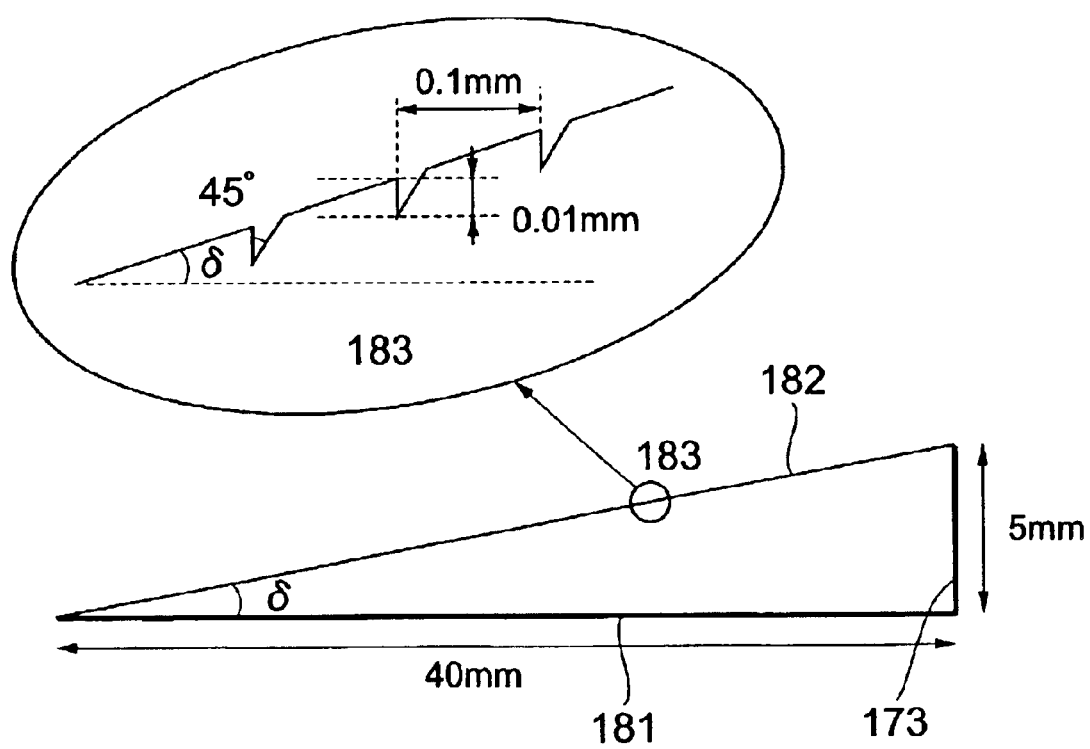
FIG. 26 is a schematic top view showing embodiment 5 of the present invention.

A linear light guide of FIG. 26 is adhered to the light director described in embodiment 3 with an ultraviolet-setting resin, and the other faces than the exit face are covered with reflecting plates made of aluminum and thereby a linear light source is made. When an LED is turned on and the emergent light angular distribution of this linear light source is measured in a similar way to the LED, the amount of light being distributed within β=±30° is 61%.

EXAMPLE 6

Figure 27:
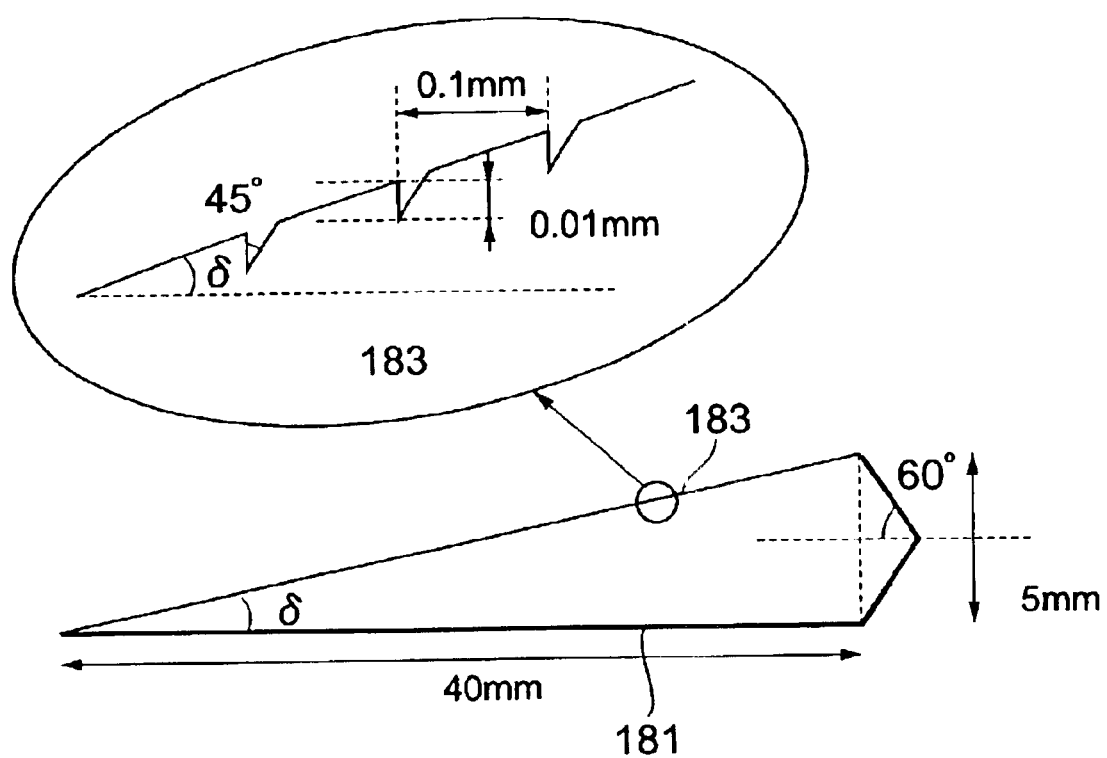
FIG. 27 is a schematic top view showing embodiment 6 of the present invention.

A desired emergent light angular distribution is determined as "β=±30°", and a linear light source is made by combining the light director portion 1 described in the embodiment 3 with a linear light guide being in the shape shown in FIG. 27 (refractive index n1=n3=1.5) (a light director portion 2 is an air layer: refractive index n2=1.0). When the emergent light angular distribution of this linear light source is measured in a similar way to the LED, the amount of light being distributed within β=±30° is 64%.

According to the light source and liquid crystal display device using this light director of the present invention, a number of improvements can be obtained. That is, it is possible to provide a light source being of a simple structure and space-saving, having an emergent light angular distribution made narrow with high efficiency, and being improved in efficiency of utilizing light, and a bright liquid crystal display device.

It goes without saying that the above numerical parameters are buy way of example only, and may vary considerably in practice.

References

1. Japanese Patent Laid-open Publication No. 10-260,405
2. Japanese Patent Laid-Open Publication No. 11-231,320
3. Japanese Patent Laid-Open Publication No. 2001-23,423
4. Japanese Patent Laid-Open Publication No. 2000-315,413
5. A paper by Singo Tamai et. al., pp. 1,247 in a collection of papers read at the Electronics Society Convention 2000, the Institute of Electronics, Information and Communication Engineers of Japan

What is claimed is:

1. The light source unit comprising:
   a primary light source; and
   a light director, comprising plural adjacent regions,
   wherein said light director takes in light from said primary light source through an entrance face and outputs the light as emergent light from an exit face,
   wherein said light director has
   i) reflective internal surfaces adjacent opposite peripheral regions of the entrance face,
   ii) a first refractive index interface and a second refractive index interface disposed along a light path from the entrance face to said exit face, each of said first and second refractive index interfaces delineating the adjacent regions within said light director having different refractive indices, and
   iii) a refractive index of a region between said first refractive index interface and said second refractive index interface and said second refractive interface has a smallest value among those of said light director,
   wherein at least one of said first and said second refractive index interfaces describes inclined planes that refract said light from said primary light source causing refracted light to pass through said first and second refractive index interfaces in a direction of the emergent light from said exit face.

2. A light source unit comprising:
   a primary light source; and
   a light director,
   wherein said light director takes in light from said primary light source through an entrance face and outputs the light from an exit face,
   wherein said light director has
   i) reflective internal surfaces adjacent opposite peripheral regions of the entrance face, and
   ii) a first refractive index interface and a second refractive index interface disposed along a light path from the entrance face to said exit face, each of said first and second refractive index interfaces delineating adjacent regions within said light director having different refractive indices,
   wherein at least one of said first and second refractive index interfaces describes inclined planes, and said inclined planes satisfying the following equation:

$$90°-\sin^{-1}(n2/n1) \leq \theta1 \leq 90°-\{\sin^{-1}(n2/n1)-\beta\} \quad \text{[Equation 1]}$$

wherein
   n1 is a refractive index adjacent the entrance side of said first refractive index interface;
   n2 is a refractive index adjacent the exit side of said first refractive index interface;
   θ1 is an angle made by said first refractive index interface and a straight line passing through the middle point of the entrance face and the middle point of the exit face; and
   β is a desired angle made by an emergent light and said straight line.

3. A light source unit comprising:
   a primary light source; and
   a light director,
   wherein said light director takes in light from said primary light source through an entrance face and outputs the light from an exit face,
   wherein said light director has
   i) reflective internal surfaces adjacent opposite peripheral regions of the entrance face, and
   ii) a first refractive index interface and a second refractive index interface disposed along a light path from the entrance face to said exit face, each of said first and second refractive index interfaces delineating adjacent regions within said light director having different refractive indices,
   wherein at least one of said first and second refractive index interfaces describes inclined planes, and said inclined planes satisfying the following equation:

$$\theta1-45° \leq \phi \leq \theta1 \quad \text{[Equation 1]}$$

wherein
   θ1 is an angle made by said first refractive index interface and a straight line passing through the middle point of the entrance face and the middle point of the exit face; and
   φ is an angle made by said reflective internal surface and said straight line.

4. A light source unit comprising:
   a primary light source; and
   a light director,
   wherein said light director takes in light from said primary light source through an entrance face and outputs the light from an exit face,
   wherein said light director has
   i) reflective internal surfaces adjacent opposite peripheral regions of the entrance face, and
   ii) a first refractive index interface and a second refractive index interface disposed along a light path from the entrance face to said exit face, each of said first and second refractive index interfaces delineating adjacent regions within said light director having different refractive indices, wherein at least one of said first and second refractive index interfaces describes inclined planes, and said inclined planes satisfying the following equation:

$$\theta1/2 \leq \theta2 \quad \text{[Equation 1]}$$

wherein

θ1 is an angle made by said first refractive index interface and a straight line passing through the middle point of the entrance face and the middle point of the exit face; and θ2 is an angle made by said second refractive index interface and said straight line.

5. The light source unit of claim 1, wherein said primary light source is an LED (light emitting diode).

6. The light source unit of claim 1, wherein the primary light source contacts said entrance face.

7. The light source unit of claim 1, wherein all internal surfaces of said light director other than said exit face are reflective.

8. The light source unit of claim 1, further comprising:

a linear light guide which is provided in the direction of emergent light from the exit face of said light director.

9. The light source unit of claim 8, wherein a reflection face is provided on a face opposite to an exit face of said linear light guide.

10. The light source unit of claim 8, wherein a face opposite to an exit face of said linear light guide is inclined.

11. The light source unit of claim 8, wherein said light director contacts an entrance face of said linear light guide.

12. The light source unit of claim 8, wherein said light director and said linear light guide are formed into one body.

13. The light source unit of claim 8, further comprising a planar light guide which is provided in the direction of emergent light from an exit face of said linear light guide.

14. The light source unit of claim 13, wherein projections or grooves are provided on a face opposite to an exit face of said planar light guide.

15. The light source unit of claim 14, wherein the refractive index of said projections or grooves is larger than that of said planar light guide.

16. The light source unit of claim 13, wherein the exit face of said linear light guide and an entrance face of said planar light guide contact each other.

17. The light source unit of claim 13, wherein said linear light guide and said planar light guide are formed into one body.

18. A liquid crystal display device comprising:

the light source unit of claim 1; and a liquid crystal display panel operatively positioned in relation to the light source unit.

19. The liquid crystal display device of claim 18, further comprising:

a planar light guide serving as a substrate of said liquid crystal display panel, and a transparent layer having a smaller refractive index than said planar light guide provided at a liquid crystal layer side of said planar light guide.

20. The light source unit of claim 1, wherein at least one of said first and said second refractive index interfaces is a folded line.

21. The light source unit of claim 1, wherein said first refractive index interface and said second refractive index interface are each in a v-shape, and said v-shape of said first refractive index interface and said second refractive index interface are different shapes.

22. The light source unit of claim 1, wherein the inclined planes of the at least one index interface are v-shaped.

* * * * *